United States Patent Office 3,574,639
Patented Apr. 13, 1971

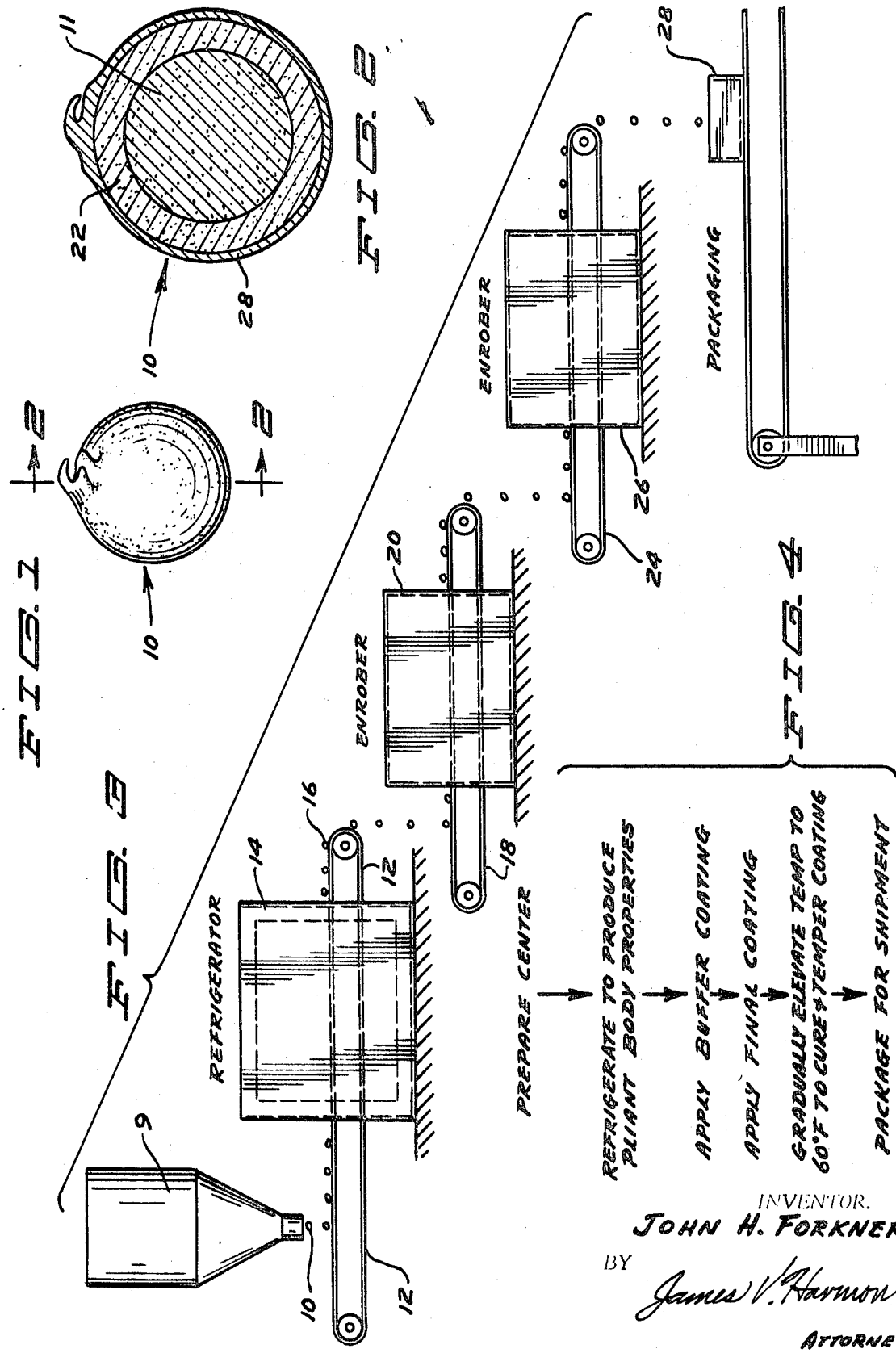

3,574,639
LIQUID CENTER CONFECTIONARY PRODUCT AND PROCESS FOR PRODUCING THE SAME
John H. Forkner, 2116 Mayfair Drive W., Fresno, Calif. 93703
Continuation-in-part of application Ser. No. 585,460, Oct. 10, 1966. This application Sept. 22, 1969, Ser. No. 864,940
Int. Cl. A23g 3/00
U.S. Cl. 99—138
6 Claims

ABSTRACT OF THE DISCLOSURE

A process for preparing syrup center coated confections having a center consisting of a caramel or fruit syrup, etc. covered with a chocolate coating. The center is first frozen before being coated and the formation of cracks and pinholes in the chocolate coating is prevented by the application of an intermediate layer of a buffer coating consisting of cheese; also products resulting from the process.

CROSS-REFERENCE TO RELATED APPLICATION

This application is a continuation-in-part of my copending application Ser. No. 585,460 filed Oct. 10, 1966, and now abandoned.

BACKGROUND OF THE INVENTION

The present invention relates to the manufacture of food products, and more particularly to the manufacture of confectionary products having syrupy centers, for convenience hereinafter referred to as "fluid centers."

Numerous processes have been previously proposed for producing confectionary products with fluid centers. Two of these processes have been used on a substantial commercial scale. The first consists of mixing an appropriate amount of an invertase enzyme with sucrose, adding sufficient moisture to give the composition a thick, paste-like consistency and thereafter coating this material with a protective edible coating such as a chocolate coating. Following the coating operation the invertase will convert the sucrose to glucose and fructose which is liquid at room temperature. This process has several important disadvantages. The application of this technique is essentially limited to use with granulated sugar which provides the plasticity required in confectionary extrusion and molding devices and retains the formed shapes in the enrobing action. Subsequently, encased within the coating the firm granulated sugar center is converted to invert altering its natural consistency to a semi-liquid which is thereafter contained within the coating jacket. In contrast, my invention has to do with coating liquids or fluid compositions which cannot be employed in this method since they are frequently in the form of an invert syrup or other liquid at the start of the process.

A second method which has found commercial success, often described as "shell molding" consists of preparing a mold called a shell in a row series on generally a water-cooled containing base or tray. Chocolate is deposited into this mold which with appropriate temperature on shell walls adheres a predetermined thickness at which point the tray is turned and the excess chocolate flows out leaving a coated mold with a cavity therein. Thereafter, liquid, generally an alcoholic confection, is introduced filling the cavity and an additional coating chocolate is applied to the surface where it is attached to exposed sidewalls. After the material is congealed, the mold is warmed with water and the molded chocolate separated from the mold. This process too has certain disadvantages. It requires expensive capital equipment and has a relatively high operating cost since it includes several steps with time intervals between.

Another disadvantage of the shell molding technique is that it is limited primarily to liquid centers illustrated by what are commonly referred to as Swiss Chocolates because deposition often carried out by means of a plunger type shut-off valve device is limited to liquid or thin depositions since in the filling of molds material tends to drip across from one mold to another.

In contrast to the limitations of the shell molding art, my invention has a number of advantages. I can deposit similar centers in some instances with the only limitation in my invention being that the alcohol must be present in limited quantity so that it will harden under refrigeration without settling out. Since little or no alcohol is used in the present invention, this limitation is avoided. In my invention the massive investment in dies, temperature controls and other equipment is not required. Moreover, the present process can be continuous in nature, minimizing direct production costs. Finally, I can coat molded or irregular forms and which may be of heavier composition than the liquid depositions of shell molding.

The term "fluid centers" is used herein to describe the range between freely flowing liquids, and plastic centers that will sustain a molded shape without the technique of my invention including confections having a substantial amount (e.g., at least 50–60%) of their sugar content of the inverted group of inverted sucrose, glucose and fructose, and possessing sufficient (e.g., at least 6–10%) moisture which when subdivided or molded at ambient temperature spread or when unrestrained do not retain the desired shape for coating with chocolate or fats having similar hardening, softening and moisture barrier properties. The term "confection" above is likewise intended to include natural syrups illustrated by honey, fondant, fruit jams, jellies and spreads characterized by their sugars being at least half inverted. In general, these products are commonly recognized by their characteristic liquidy, fluid, soft moldable creamy consistency and commonly recognized to be difficult to mold or to form and subdivide or to retain their formed shape until encapsulated within a fat coating like chocolate. A characteristic qualifying these fluid centers is that if contacted with chocolate whle they are at a temperature below about 20° F. they will crack or cause pinholes in the chocolate. While the formation of cracks and holes will occur at temperatures up to about 20° F., I prefer to form such centers at temperatures below 0° F. and preferably below —20° F.

SUMMARY OF THE INVENTION

In an attempt to overcome difficulties apparent to any confectioner in subdividing and molding these compositions referred to above as "fluid centers," I applied an otherwise common technique of hardening them by refrigeration using temperatures in the order of —20° F. and with several varieties as low as —40° F. As would be expected, the application of refrigeration did harden and at lower elevations even made the confection brittle when either a thin or thick syrup was used. Also as expected, by modifying the temperature to a predetermined schedule, I could affect the plasticity of the fluid centers so they could be formed and subdivided by suitable devices common in candy manufacture. Thereafter, the hardened fluid centers molded or extruded, rounded or subdivided as is common in confectionary practice, were in the refrigerated state coated with chocolate by usual means ranging from hand dipping a thick viscous coating, to enrobing and panning. Quite unexpectedly, following the refrigeration required to properly modify high invert and high moisture fluid and soft plastic confections, a coating like chocolate could not be successfully applied because the coating was found to develop cracks, breaks, pinholes and other discontinuities through which would subsequently flow the fluid centers with their elevation in temperature consequent to temperatures experienced in merchandising or eating.

The precise reason why these cracks develop is not completely understood. It is observed though that they are associated with the coating process of a refrigerated product and are not a result of later conditions. Cracks develop particularly where coating is applied to a fluid center refrigerated to below 0° F. and for many fluid confections such as fondant, honey and fluid caramel, I find that −20° F. is optimum. Immediate microscope examination after the chocolate coating is applied shows that the breaks occurred immediately after the coating step. The reason for this may be due to the narrow range in chocolate between its fluid and congealing temperature. The chocolate may contract when it contacts the chilled surface of the congealed center. Liquids forming in the contact area may be compressed instantly between the rigid chocolate and the still rigid impermeable fluid refrigerated center. The result may be that the chocolate gives, breaks or releases the pressure through instant formation of pinholes. The formulations of the confection coating materials to which I have reference include hard fats having a melting point of the order of 100° F. or higher. They tend to brittlize at temperatures below 32° F., which may contribute to cracking. In any event, the result is self-evident and the contacting chocolate coating will invariably crack if the center or core is a fluid invert syrup composition at a temperature below 20° F. If this result was obtained with products in general, the phenomena would not be so surprising, but with the present invention a host of products not characterized by a high sugar content and particularly a high invert sugar content can be contacted at temperatures below −40° F. without cracking the chocolate or causing pinholes.

In general it is an object of the invention to provide a practical process for manufacturing fluid-center confections by applying an external coating shell while the center is at a low temperature and in solid form. A feature of the invention is the use of a buffer medium between the solidified center and the outer shell to prevent the formation of pinholes or cracks in the coating shell.

Another object is to provide novel liquid center confections resulting from my process.

Another object is the provision of an improved confectionary product and process wherein a variety of liquid center materials can be employed including naturally occurring and artificially produced syrups, sugar bearing fruit extracts and such compositions familiar to the confectioner.

Another object is to provide a simple means of coating liquid confections without the complicated equipment or delayed steps in processing which are common in the present manufacture.

Simply expressed, the invention is in part based upon the observation that some compositions, such as invert sugar confections, crack and cause pinholes when contacted in the frozen state with a moisture barrier coating such as chocolate. The invention includes chilling of syrups for the purpose of sustaining their individual form, coating them with a special buffer, and then applying a moisture barrier outer coating such as chocolate. The completed confection at ambient room temperature consists of an outer shell which is free of pinholes and cracks and an inner liquid center. The buffer medium may be retained as a lining over the inner surface of the shell, or it may ultimately blend with the liquified core material.

BRIEF DESCRIPTION OF THE DRAWING

FIG. 1 is a side elevational view of a confection embodying the invention;

FIG. 2 is a transverse sectional view of the confection of FIG. 1;

FIG. 3 is a diagrammatic side elevational view of an apparatus for carrying out the invention; and FIG. 4 is a flow chart illustrating the steps performed in a preferred form of the invention.

DESCRIPTION OF THE PREFERRED EMBODIMENTS

As previously stated, the invention consists of utilizing reduced temperatures for the purpose of bodying or solidifying fluid sugar-containing material and molding or subdividing to the desired physical form, applying a buffer medium to the solidified center form and then applying the exterior shell coating while the center form remains solid at the low temperature below 32° F.

In the work leading to the development of the invention it was found that elevating the temperature of the center to narrow the temperature differential between coating and the center would not eliminate the discontinuities since the syrup present requires temperatures well below the freezing point of water to give the liquid or fluid centers sufficient hardness to be coated with chocolate.

It was discovered that the presence of sugar and particularly invert syrup causes pinholes in the chocolate coating. It was at first though that the pinholes were caused by the low temperature necessitated by the high sugar content of the center. However, many products characterized containing little or no sugar do not produce this result even at similarly low temperatures, and in many instances even at much lower temperatures.

In accordance with the invention, the syrupy confection is first chilled to a temperature required for processing. It is then coated with a buffer medium. The chocolate coating is then applied but in the coating process and while low temperature is present the buffer prevents the formation of cracks or pinholes in the chocolate coating.

It is thus one feature of the invention to provide a fluid center and to create between it and a subsequent coating a buffer that does not crack the chocolate at the same low temperature or at higher temperatures effective in gealing and sustaining the attached buffer. For example, the core center may be 0° F. when the buffer contacts the core. It may chill the buffer surface to 30° to 40° F. which remains relatively congealed and firm when contacting the chocolate coating.

The buffer medium which I have found to be particularly effective is cheese. The term "cheese" as used herein has reference to cheeses and cheese compositions which can be used to provide a medium of suitable consistency to coat the frozen center, and to prevent the development of pinholes and cracks in the exterior chocolate coating. I can use the more common natural cheeses such as Cheddar cheese and cream cheese. Also I can use the so-called pasteurized and processed cheeses, and pasteurized and processed cheese spreads which contain added ingredients such as skim milk and whey solids. Such cheese has a butterfat content which in some instances may be as high as about 44% (e.g., American cheese) and a protein content which may range from about 20 to 35%.

In the foregoing I have referred to use of an exterior chocolate coating. Such confection coatings commonly contain cocoa fat, sugars and milk solids. As is well known, supplemental fat (e.g., butterfat) may be added for enrichment and lecithin may be added to minimize blooming. For use with the present invention, conventional chocolate coating formulations can be used as known to the confection industry, provided the resulting coating has sufficient strength to retain intact as an enclosing shell. The coatings, however, may have a flavoring other than chocolate. The confection coating may be modified by variations in the melting point of the fat content. I employ coating having hard or high melting point (e.g., melting point about 100° F. or higher) fats, and which are known as "summer coatings." These provide a moisture barrier which promotes long storage life without loss of moisture, and which remains as an intact shell in contact with the liquid core.

In some instances the buffer coating may be covered with a relatively thin layer of a suitable adhesive to improve the bond between the buffer coating and the barrier coating. Such a need may be occasioned in storage to provide a base to support and retain the attached chocolate. Such adhesives may comprise tacky substances known to the art as hydrophilic colloidal gums and the like.

In some instances the surfaces of the buffer coating may be melted by brief exposure to heat just prior to enrobing with the chocolate coating, thereby producing an improved bond.

The buffer medium is in liquid or plastic state and at a temperature well above 32° F., such as ambient room temperature. It is solidified when chilled by contact with the frozen core. The exterior coating is therefore applied to the solidified buffer medium.

Referring now to the figures which illustrate the steps performed in carrying out the invention, first the syrupy fluid centers 10 are dropped out of a depositor 9. These centers have sufficient plasticity to sustain a droplet form as they travel on conveyer 12 until sustained by refrigerator 14 to provide formed centers 16. To utilize liquids, I subject them to temperatures sufficient to make them plastic enough to work and then form them by extrusion, round and finally subdividing.

The fluid centers 10 prior to refrigeration may result from droplet deposition and may be characterized as spheroidal or elliptical or cylindrical or molded within a mold having any of a variety of shapes. The chilled centers or cores 16 are shown being removed from refrigerator 14 on conveyer belt 12 and the emerging pieces can be at any stage of hardness consistent with coating requirements ranging from a soft barely sustaining plastic to brittle. Although the refrigeration temperature can be varied, I find that for syrups practical to this invention as elsewhere described the core temperature should be below about 32° F. with optimum in most instances being at or below about —20° F. These temperatures exemplify those at which cracking of the coating will take place without the invention.

From the conveyer belt 12 the pieces drop onto a conveyer 18 and are carried through an enrober 20 which applies the buffer coating 22 as seen in FIG. 2. Chilling of the buffer coating causes it to congeal or harden.

From conveyer 18 the coated pieces drop onto a conveyer 24 and are carried through an enrober 26 where the coating 28 formed from an edible confection material such as chocolate is applied.

A buffer medium such as cream cheese can be deposited with an enrobe similar to that normally used for chocolate coating. The unit 20 is illustrative of various coating methods such as use of a mixer, panning device, pressurized spray means or dipping. Any suitable means of applying the buffer to the chilled center can be used provided it be done before the center loses its hardness or shape. If in the coating process the particles tend to adhere to one another, they may be separated in tumbling as by sprinkling in a small amount of Dry Ice.

It is well known that chocolate coatings need time at proper temperature for curing. Low temperatures will harden but not necessarily properly cure. I find that with intended ambient storage I can gradually elevate the product temperature after coating to about 60° F. while retaining dehumidified conditions and allowing enough time to properly cure so as to temper the coating. The temperature can then be further elevated to conventional chocolate storage conditions of 75° F. However, where the product is retained under refrigeration, I find my best product is achieved by first allowing the temperatures to elevate to 60° F., which allows the oils to migrate and reassemble, and after curing for an hour or even longer I then reduce the product temperature to refrigerated storage temperatures of about 40° F.

The final hardening of the exterior coating must be carefully watched because of the cocoa butter content and poor heat conductivity of chocolate. The ideal coating chocolate after hardening should contain small crystals of cocoa butter. If the chocolate is cooled too slowly to insure solidification of all the fat, large crystals may result. If cooled rapidly, an unstable supercooled liquid cocoa butter will be obtained. Heat of crystallization with cocoa fat may melt the low melting fractions of the fat, thereby causing fat bloom.

In practice it has been found that at the time the chocolate coating is applied, there is a temperature differential between the buffer coating and the chilled core. That is, the buffer assumes a higher temperature than that of the core.

In the foregoing I have described a single buffer coating and a single chocolate coating over the buffer coating. However, in some instances it may be desirable to use more than one coating application for both the buffer medium and the exterior chocolate.

It should be understood that various methods can be used to form the solidified cores, including chilling to semisolid form followed by molding, extrusion or sheeting, subdividing or freezing in molds. In any event, the cores are solidified and at a low temperature when the coatings of the buffer medium and chocolate are applied.

Examples of my invention are as follows:

Example 1

One pound of commercially produced caramel candy in cubes about ¾ inch in width was placed in a double boiler and heated to 180° F. Into this mass was melted 4 oz. of butter and 4 oz. of cream plus ½ oz. salt and artificial caramel flavoring. The mass was cooled to around 130° F. and deposited into starch molds which were imprinted about ⅜ inch wide and deep. The tray of molds was placed in a deep freeze refrigerator until the pieces were hard enough (about 20° F.) to separate from the starch. After separation the temperature of the pieces was further reduced to —20° F. with direct action of refrigerated atmosphere and retaining individual properties of the pieces.

A buffer coating was prepared from cream cheese diluted with 20% of cream, using a medium seed power mixing action with a dough blending arm. The chilled pieces were placed in a rotating bowl, simulating a confectioner's pan, with the surfaces of the pan being retained at ambient temperatures by warming its outer surface. The pieces were tumbled in a thin stream of an equal weight of the cheese coating. In a few instances clumping took place but the pieces were separated by sprinkling in a little pulverized Dry Ice. It was found necessary to add the coating slowly and thinly so that it hardened rapidly on the pieces. The heavier pieces as they became attached continuously broke apart, thereby retaining them separate. This was a progressive action and rapidly accomplished. The cheese coating hardened in 10 seconds or less.

While tumbling of the pieces continued, a power extruder was used to apply an outer film coating of chocolate that had been heated above its melting point and then cooled to about 90.5° F. to obtain proper consistency for depositing. The pieces were separated before becoming attached by the hardening chocolate. The chocolate hardened in contact with the chilled cheese coated pieces. However, the cheese coating on its surface was not nearly as cold as the interior confection. I estimated the cheese to be about 0° F., and the caramel core below 0° F. It was observed that no pinholes or cracking developed in the outer chocolate coating.

In subsequent tests it was established that even at lower temperatures in the order of below zero the cheese did not crack the chocolate or cause pinholes, whereas the chilled caramels alone when coated with chocolate created exuding pinholes or cracking in every instance.

Separate tests with chilled solidified honey pieces at a temperature of the order of −40° F. and dipped with heavy coatings of chocolate showed pinholes and cracks in all pieces.

In a separate instance after depositing the intervening cheese coating described above, the chilled pieces were heated while being conveyed to warm the surfaces and thereafter the chocolate coating was applied. This achieved a better bond between the intervening substance and the outer coating.

Example 2

The procedure of Example 1 was followed except that the centers consisted of drained preserved whole strawberries which were frozen individually to −20° F. The buffer coating consisted of cream cheese diluted with 20% cream and blended with a hand mixer.

The chilled strawberries were then placed in a mixing bowl. An equal portion by weight of the buffer was added intermittently as a coating. The mixer was run at medium speed. At intervals a little pulverized Dry Ice was added to break up clumps that tended to form as the continuously growing coated particles adhered with congealing of the coating. By means of the low temperature imparted by the prechilled base particles (strawberries) and the additive refrigerant (Dry Ice), the liquid deposition of cheese was rapidly converted to a plastic state reducing its extensible properties to a shortness that allowed the masses to be separated easily while they continued to move. The abrading action spread the buffer uniformly and produced a rough sort of coating uniform for the purpose. Sufficient heat was applied on the mixing bowl so that it did not attach cheese to its inner surface and that which became attached was picked up by the colder surfaces of the particles.

The centers coated with the cheese buffer were then hand dipped in melted chocolate without cracking of the chocolate coating or forming of pinholes. In various instances the pieces were coated at different temperatures ranging from below zero to above zero, retaining at least enough low temperature to sustain the coated piece and to keep the center centered in the cheese. There was no problem in cracking or pinholing. In contrast, when an attempt was made to directly coat the frozen strawberries preserved with sugar at a temperature at which they were free flowing and easy to handle with chocolate, both cracks and pinholes developed in the chocolate coating.

In the foregoing examples a cheese was mixed with cream to provide a fluid consistency suitable for coating and to increase the butter fat content. It will be evident that in instances where such enrichment is not necessary or desirable, the cheese can be mixed with comparable amounts of water or other compatible aqueous liquids.

It is apparent that many modifications and variations of this invention as hereinbefore set forth may be without departing from the spirit and scope thereof. The specific embodiments described are given by way of example only and the invention is limited only by the terms of the appended claims.

I claim:
1. A process for producing a confection of the liquid-center type comprising forming a syrup which is essentially liquid at room temperature into a solidified body by chilling the syrup to a temperature below 32° F., the body retaining its solidified condition by virtue of its chilled condition, coating the body with a liquid buffer medium comprising cheese having a fat content and a protein content of the order of from 20 to 35%, said medium being applied while the body is so chilled whereby a coating of cheese is applied to the chilled body, and then applying an exterior fat containing confection coating over the cheese while the body remains chilled and solidified, the cheese coating serving to prevent the formation of pinholes and cracks in the exterior coating of the final product at the time of coating.

2. A method as in claim 1 in which the exterior confection coating is a chocolate coating.

3. A method as in claim 1 in which the temperature of the product after application of the exterior coating is elevated for a limited time to cure the coating and thereafter the product is caused to assume storage temperature with its body in liquid condition.

4. A method as in claim 1 in which the cheese contains added butterfat.

5. A method as in claim 4 in which the cheese coating is at a temperature higher than that of the chilled body when the exterior coating is applied.

6. A confection product produced by the process of claim 1.

References Cited

UNITED STATES PATENTS 2,682,471   7/1954   Alther _____ 99—138

JOSEPH M. GOLIAN, Primary Examiner

U.S. Cl. X.R.

99—134